United States Patent [19]
Burn

[11] 3,987,347
[45] Oct. 19, 1976

[54] TEMPERATURE STABLE MONOLITHIC CERAMIC CAPACITOR WITH BASE METAL ELECTRODES

[75] Inventor: Ian Burn, Williamstown, Mass.

[73] Assignee: Sprague Electric Company, North Adams, Mass.

[22] Filed: May 29, 1975

[21] Appl. No.: 582,060

[52] U.S. Cl. .............................. 317/258; 252/63.5
[51] Int. Cl.² .......................................... H01G 4/12
[58] Field of Search .................. 317/258; 252/63.5; 264/61

[56] References Cited
UNITED STATES PATENTS

| | | | |
|---|---|---|---|
| 2,946,937 | 6/1960 | Horton | 317/258 |
| 3,041,189 | 6/1962 | Horton | 317/258 UX |
| 3,523,028 | 10/1970 | Prokopowicz | 252/63.5 |
| 3,534,238 | 10/1970 | Buehler | 317/258 |
| 3,920,781 | 1/1975 | Eror | 264/61 |

FOREIGN PATENTS OR APPLICATIONS

| | | | |
|---|---|---|---|
| 133,698 | 10/1973 | United Kingdom | 317/258 |
| 1,064,325 | 5/1967 | United Kingdom | 317/258 |

*Primary Examiner*—E. A. Goldberg
*Attorney, Agent, or Firm*—Connolly and Hutz

[57] ABSTRACT

A monolithic ceramic capacitor having base metal electrodes is described that meets the standard TCC limits of ± 15% from −55° C to 125° C. The ceramic includes small quantities of acceptor dopants, particularly manganese added to barium titanate and an alkali-earth-metal-zirconate. When fired from 1250° C to 1400° C in a partial oxygen atmosphere of $10^{-7}$ to $10^{-9}$ atmospheres of oxygen, a liquid phase sintering occurs during which the titanate-zirconate grains do not grow and there is formed a concentration gradient of the zirconate near the grain surfaces while a liquid manganese titanate forms a second and immiscible phase in the grain boundary regions.

7 Claims, 7 Drawing Figures

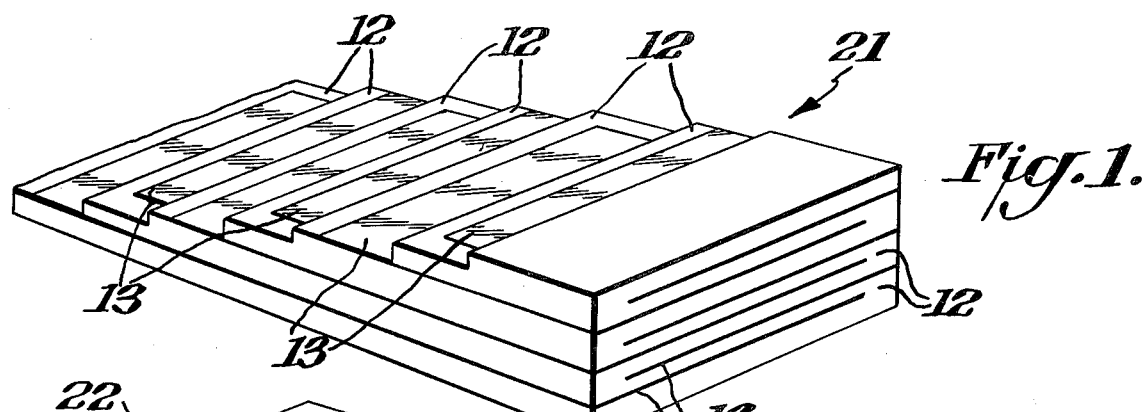
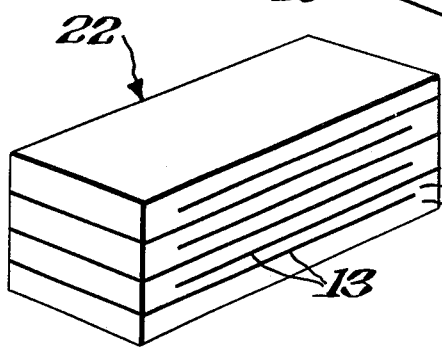
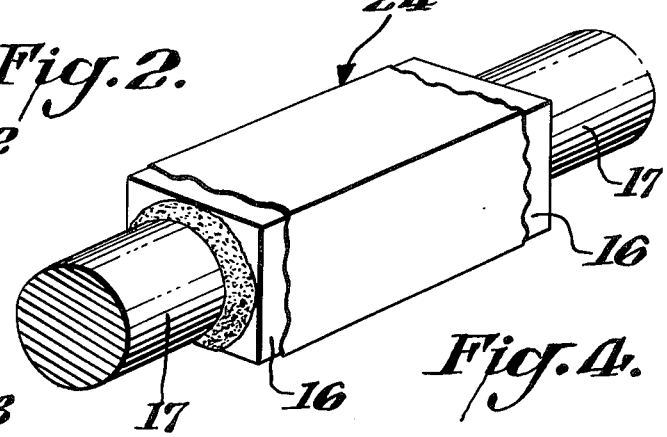
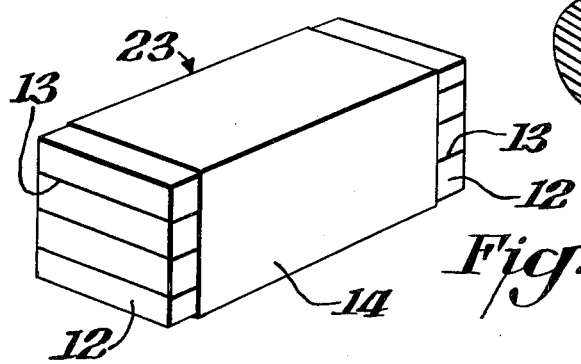
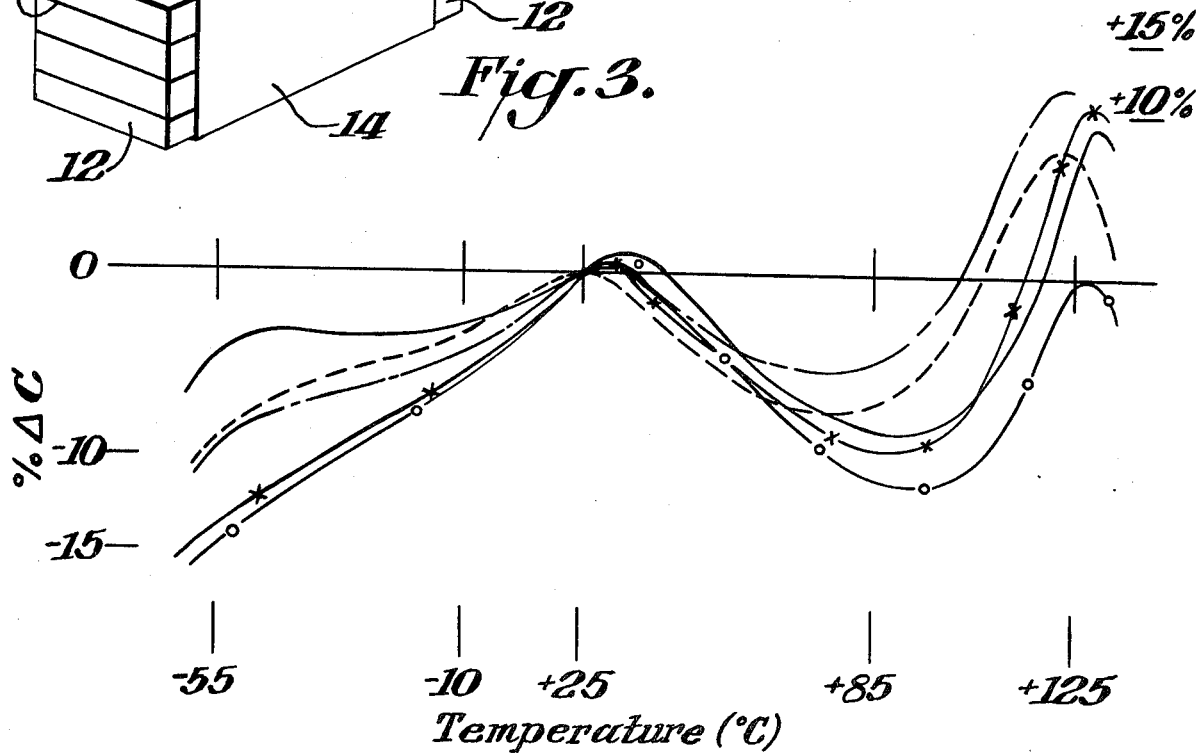

TEMPERATURE STABLE MONOLITHIC CERAMIC CAPACITOR WITH BASE METAL ELECTRODES

BACKGROUND OF THE INVENTION

The present invention relates to temperature stable monolithic ceramic capacitors with base metal electrodes, and more particularly to such capacitors having a plural phase ceramic dielectric material.

In a patent to Prokopowicz, U.S. Pat. No. 3,523,028 issued Aug. 4, 1970 and having a common assignee with this invention, there is described a somewhat similar ceramic material being characterized as consisting of two phases. However, the ceramic dielectric material employed in this invention is capable of being fired together with interleaved base metal electrodes and differs in formulation and structure from the patented material; and the two materials are considered to have complimentary uses.

In a pending U.S. patent application by Eror et al, Ser. No. 130,692 filed Apr. 2, 1971 now U.S. Pat. No. 3,920,781 issued Nov. 1, 1975 and a corresponding British patent No. 1,333,698 issued Oct. 10, 1973, there is described a monolithic ceramic capacitor having base-metal electrodes. The single phase large grain ceramic in these capacitors has a dielectric constant of around 10,000 and a temperature coefficient of capacitance (TCC) better than +22% and −56% from +10° C to 85° C, which TCC limits correspond to the Electronic Industries Association (E.I.A.) standard, designated Z5U. Another E.I.A. standard, designated X7R requires temperature stability within ± 15% from −55° C to 125° C. A large majority of all monolithic ceramic capacitors made today are required to meet one or the other of these two standards.

The increasingly high cost of the noble metals commonly used as electrodes in monolithic capacitors intensifies the need for a low cost base-metal electrode counterpart. Since it is necessary to fire base metal electrode capacitors in a reduced oxygen atmosphere to avoid oxidizing the electrode, severe restraints are imposed on the selection of the constituents of the ceramic material which are subject to being reduced and made semiconducting at firing, and which could therefore produce low insulation resistance in the completed capacitor. Attempts to make similar capacitors based on barium titanate with base-metal electrodes have resulted heretofore in dielectrics with substantially lower permittivities and/or temperature stability over a narrower range of temperature. In these previous attempts, large quantities of additives have been included in the ceramic that form low permittivity phases and as a consequence have resulted in low permittivities, (generally less than 2000) and/or inadequate temperature stability.

It is therefore an object of this invention to provide a monolithic ceramic capacitor having base metal electrodes that meets the TCC standard designated X7R.

It is a further object of this invention to provide a temperature stable monolithic ceramic capacitor having a ceramic dielectric of which the dielectric constant is greater than 2000.

It a further object of this invention to provide a temperature stable monolithic ceramic capacitor having a high capacity per unit volume and exhibiting an insulation resistance-capacitance product that is greater than 500 ohm-farads at 25° C and greater than 15° at 125° C.

SUMMARY OF THE INVENTION

A temperature stable monolithic ceramic capacitor is described that includes at least one embedded base metal electrode and that meets the E.I.A. standard X7R for temperature coefficient of capacitance while having a high insulation resistance-capacity product. The temperature stability is basically obtained in the ceramic dielectric by using a barium titanate with additions of an alkali-earth-metal zirconate selected from barium, calcium and strontium. The barium titanate and the zirconate are sintered together with a small quantity of acceptor ions always including manganese which forms a dense fine grained structure wherein the titanate-zirconate solid solution does not reach chemical equilibrium. Consequently a concentration gradient of the zirconate exists in the outer portions of the titanate-zirconate grains and the temperature characteristics of the resulting ceramic are thereby smoothed out instead of forming a sharp peak.

The small manganese addition is responsible for the incomplete reaction in the titanate-zirconate grains and furthermore prevents grain growth. This is achieved by forming a manganese titanate phase which becomes liquid at the temperatures used for sintering, namely between 1250° C to 1400° C. Provided that the initial $BaTiO_3$-$CaZrO_3$ mixture is close to stoichiometry in large and small cations, the formation of a manganese titanate phase results in an excess of large cations (e.g. Ba, Ca and Sr) in the titanate-zirconate mixture, a situation that has been found to retard homogenization. Furthermore, densification is achieved by liquid phase sintering and the manganese also protects the titanate ceramic from becoming semiconducting when fired in the atmospheres needed to protect nickel or other base metal electrodes from oxidation.

Among the acceptor elements that help to inhibit conductivity and smooth the TCC characteristic in the ceramic material of this invention, manganese is found to be the most effective and indeed at least 0.5 mole percent manganese is found to be essential although more than 2.3 mole percent manganese produces negligible benefit and results in a decrease in the permittivity. Other acceptor additives in order of preference are magnesium, chromium, cobalt and iron but these additives should not exceed 1.7 mole percent nor should the total of all acceptor additives exceed 2.5 mole percent to provide the desired stable TCC. Other acceptors such as aluminum and boron are not suitable additions nor is silicon, principally because of their adverse effect on temperature stability. It is also noted that donor elements such as cerium, niobium and uranium are not suitable for inclusion in the ceramic material of this invention for the same reason and also because of their depressing effect on insulation resistance.

It is important to use stoichiometric barium titanate for preparing the ceramic materials of this invention so as to accurately control the ratio of large to small cations that are to be contained in the fired dielectric ceramic. For the purpose of this invention, large cations are defined as those having ionic radii of more than 0.90A, and small cations those having ionic radii less than 0.90A, using measurements as computed by L. Pauling. For example Ba, Ca and Sr are large cation elements while Ti, Zr, Mn, Mg, Co, Cr, Fe, Al, and B are small cation elements. Thus stoichiometric $BaTiO_3$ has a large to small cation ratio of 1.0 as does $CaZrO_3$. When, for example, stoichiometric $BaTiO_3$ is mixed with a quantity of Mn amounting to 2.5 mole percent of the total mixture, then the ceramic mixture has a large to small cation ratio of 0.975. All of the cations present must be accounted for when making this computation. In the fired ceramic materials of this invention the overall L/S cation ratio lies between 0.975 and 1.0, but in this two phase material the manganese reacts with and removes a small quantity of titanate from the otherwise stoichiometric grains to form a manganese titanate interstitial phase at the grain boundaries and changes the ratio of large to small cations in the grains themselves to a value greater than 1.0.

It is necessary to restrict the temperature range of firing the ceramic materials of this invention to no less than 1250° C, since liquid phase sintering is not effected at lower temperatures, and to no greater than 1400° C because nickel electrodes become molten at about 1450° C. Copper is thus not a suitable electrode base metal for use in this invention, but other base metals such as cobalt and iron or alloys thereof may be used.

Partial oxygen atmospheres for firing are also preferably restricted to within $10^{-7}$ to $10^{-9}$ atmospheres of oxygen. More reducing atmospheres than $10^{-9}$ oxygen atmospheres such as those obtained when hydrogen is a major constituent, cause degradation in insulation resistance while more oxidizing atmospheres than $10^{-7}$ oxygen atmospheres approach or exceed the base-metal/base-metal-oxide equilibrium condition where the electrode will oxidize and become open or highly resistive, and where there is also a tendency for the electrode to dissolve into the ceramic, degrading its electrical properties.

Thus a base metal electrode capacitor of this invention uniquely provides a high capacity per unit volume, a high insulation resistance capacity product and a TCC within ± 15% referenced to the capacity at room temperature over the broad temperature range of −55° C to 125° C. This desirable combination of properties has heretofore been unattainable in a base metal electrode ceramic capacitor. In formulating the dielectric ceramic of capacitors of this invention that must be fired in an atmosphere of partial oxygen pressure, it is essential to employ close stoichiometry and to limit the additions of TCC modifying acceptors to very small quantities. Heretofore, it has been taught that such small quantities of acceptors would be inadequate for achieving a high insulation resistance, and consequently the use of much larger quantities have led to ceramic materials that have a severely unbalanced stoichiometry and that contain a large intergranular phase that prevents the attainment of a high dielectric constant.

BRIEF DESCRIPTION OF THE DRAWINGS

FIG. 1 shows a perspective view, partly broken, of a stack assembly wherein layers of a green ceramic slip have base-metal electrodes sandwiched there between.

FIG. 2 shows a perspective view of a capacitor chip or body having been cut from the stack assembly of FIG. 1.

FIG. 3 is a perspective view of a capacitor body having been fired to maturity and having a dielectric coating over a central portion thereof.

FIG. 4 is a perspective view of a completed monolithic capacitor of this invention with leads attached.

FIG. 5 consists of a family of curves showing the temperature coefficient of capacitance (TCC) for a variety of capacitors of this invention.

DESCRIPTION OF THE PREFERRED EMBODIMENTS

EXAMPLE 1

Figure 6:
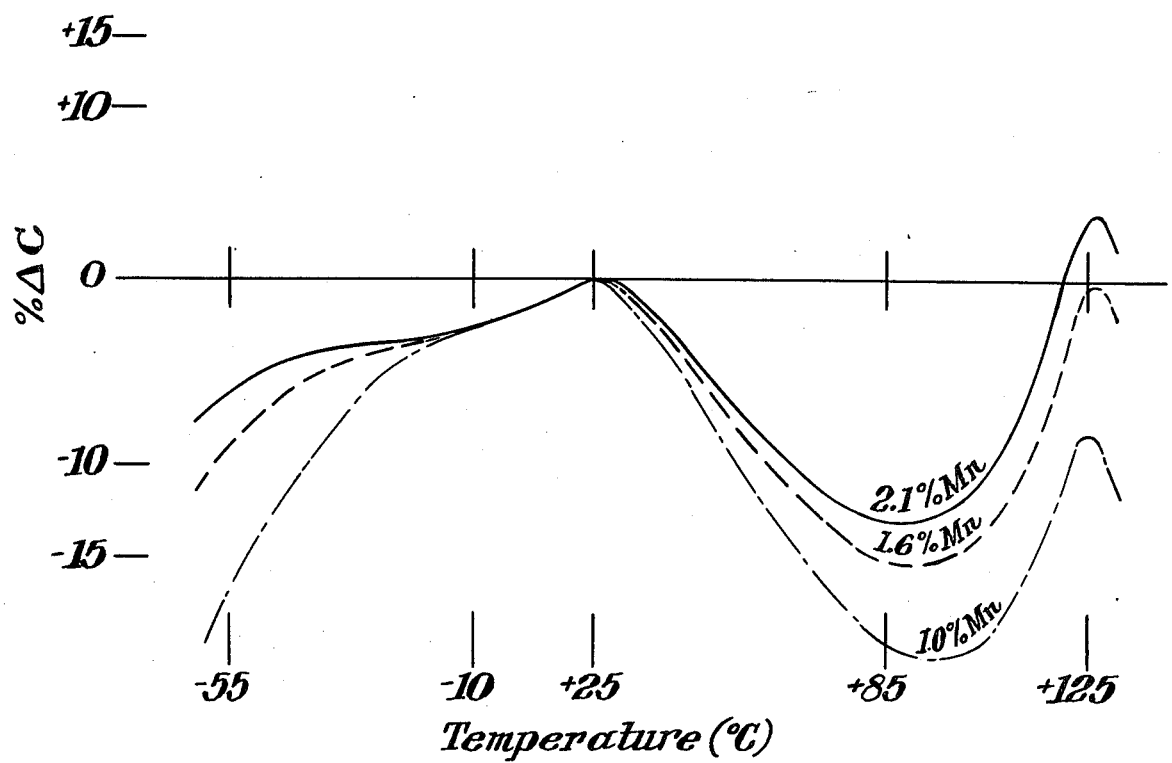
FIG. 6 consists of a family of curves showing the effect on TCC of various amounts of manganese in the ceramic dielectric of capacitors of this invention.

High purity $BaTiO_3$ was prepared from stoichiometric amounts of $BaCO_3$ and $TiO_2$ by calcining at 2300° F (1260° C) and then granulating. To 194 grams of this stoichiometric barium titanate were added 6.0 grams of $CaZrO_3$ and 2.12 grams of $MnCO_3$. These powders were then milled with 86 grams of an organic medium for 6 hours in a porcelain mill (00 size) containing alumina balls. Hand screened nickel electrode monolithic capacitors were made having a single active dielectric layer approximately 80 micrometers thick and 10 square millimeters in area after firing. These capacitors were fired at 1350° C for 2 hours in a $CO_2$-CO mixture of 6:1 producing an oxygen partial pressure of $10^{-8}$ atmospheres of oxygen. The constituents in mole percent of the dielectric ceramic as calculated from the above recipe, are 94.1% $BaTiO_3$, 3.8% $CaZrO_3$ and 2.1% Mn; the ratio of large to small cations being 0.979. When fired, terminations were made to the nickel electrodes by using air-dry silver paint for one group of the capacitors, and by using a nickel termination paste for another group and processing as described in my U.S. patent application Ser. No. 457,042 filed Apr. 1, 1974. The latter termination method would allow leads to be applied by dip-soldering, if required. Alternatively leads could be applied by the method described by Hurley in U.S. Pat. No. 3,809,973 issued May 7, 1974.

The capacitors so formed had a capacitance of 3500–4000 picofarads and DF of 1.0% as measured with 0.5 VAC at 1 kHz. Dielectric constant at 25° C was in the range 2600–3000, and temperature coefficient of capacitance (TCC) was well within ± 10% from −55° C to 125° C as shown by the solid line in FIG. 5. Insulation resistance was 400-1000 ohm-farads at 25° C and 15-60 ohm-farads at 125° C.

EXAMPLE 2

To 90.0 grams of barium titanate purchased from TAM Division of NL Industries (COF grade lot No. 19) 4.0 grams of calcium zirconate were added together with 0.75 grams manganese carbonate and 0.325 grams magnesium carbonate. Because the barium titanate contained an excess of $TiO_2$, 2.0 grams of $BaCO_3$ were added to correct the stoichiometry. This mixture was milled for 16 hours in a porcelain mill (000 size) with barium titanate balls and 30 grams of organic binder. Hand screened monolithics with nickel electrodes were made as in example 1, and were fired under the same conditions. The constituents in mole percent of the dielectric ceramic as calculated from this recipe, are 92.2% $BaTiO_3$, 5.3% $CaZrO_3$, 1.6% Mn and 0.9% Mg; the ratio of large to small cations being 0.975. Some capacitors (see solid line broken with dashes in FIG. 5) were annealed in air at 750° C to simulate the conditions of making fired-on silver terminations as described in the aforementioned Hurley patent, while others (see dashed line in FIG. 5) were terminated with an air-dry silver paint and were unannealed.

The capacitors had values of 2600-3500 picofarads with DF of 2.2% (0.5 VAC, 1kHz). Dielectric constant was in the range 2400-2700 at 25° C with TCC close to ± 10% from −55° C to 125° C as shown in FIG. 5. Insulation resistance was 600 ± 100 ohm-farads at 25° C and 60 ± 20 ohm-farads at 125° C.

EXAMPLE 3

To 98.0 grams of stoichiometric barium titanate, 2.0 grams of calcium zirconate, 0.50 grams of manganese carbonate and 0.25 grams of chromium sesquioxide ($Cr_2O_3$) were added. These powders were milled as in example 2, and nickel electrode monolithic capacitors were made as in example 1 and also fired at 1350° C for 2 hours with an oxygen partial pressure of $10^{-8}$ atmospheres of oxygen. The constituents in mole percent of the dielectric ceramic as calculated from this recipe, are 95.7% $BaTiO_3$, 2.55% $CaZrO_3$, 1.0% Mn and 0.75% Cr; the ratio of large to small cations being 0.983. Some were annealed afterwards as in example 2. Capacitance was about 3000 picofarads and DF at 0.5VAC and 1kHz was 1.1%. Dielectric constant was 2750 ± 15% from −55° C to 125° C for both the annealed and the unannealed capacitors. The TCC curves are shown in FIG. 5, annealed capacitors being represented by the solid line broken by small circles and the unannealed capacitors being represented by the solid line broken by x's. Insulation resistance was in the range 800-1500 ohm-farads at 25° C, and 30-130 ohm farads at 125° C.

Monolithic ceramic capacitors similar to those described in examples 1, 2 and 3, are illustrated in the drawings. There is shown in FIG. 1 an assembly of ceramic dielectric layers 12 and interleaved layers of long, narrow strips of base metal electrodes 13. Electrodes of nickel or alloys thereof are preferred. The assembly is continued in this fashion until, as at 21, the desired number of layers has been obtained. The individual bodies, e.g. 23 as shown in FIG. 3, can then be coated with a dielectric material 14 over the central portion of the cut surfaces so as to cover the edges of the electrodes that have been exposed in this central region. It is to be noted that the layers of electrode strips are alternately staggered so that after the assembly is cut, alternate of the electrodes are exposed at one end surface and the remainder of the electrodes are exposed at the opposite end surface of a monolithic capacitor body 22 as shown in FIG. 2. These individual bodies are then fired to maturity after which the opposite surfaces with exposed electrode layers are abraded to remove any ceramic covering the electrode edges. A conductive coating 16 is applied to these two surfaces, each contacting the exposed electrodes, and terminal wires 17 may be attached to each coating 16 forming the completed capacitor 24 as shown in FIG. 4.

EXAMPLE 4

To 95.0 grams of stoichiometric barium titanate, 5 grams of calcium zirconate was added together with a quantity of manganese dioxide. Three groups of capacitors were made, as is described for examples 6 through 25 following, only differing from each other in the quantity of manganese dioxide having been added. The capacitors for quantities of 0.8, 0.6 and 0.4 grams $MnO_2$ respectively, exhibited TCC curves as shown in FIG. 6. These $MnO_2$ quantities correspond to 2.1, 1.6 and 1.0 mole percent manganese (examples 4a, 4b and 4c, respectively) in the ceramic dielectric. There was in the first group 91.6 mole percent barium titanate and 6.3 mole percent calcium zirconate. From this controlled experiment the role of the manganese is clearly to smooth the capacity versus temperature characteristic even though the quantities employed are very small. It is undesirable to employ large quantities of acceptor additives that form the intergranular phase in the ceramic since they tend to depress the dielectric constant as is generally predictable by conventional mixing rules. These three groups of capacitors meet the aforestated objects of this invention with respect to insulation resistance and to dielectric constant.

EXAMPLE 5

In another controlled experiment the manganese additive is held constant at 2.1 mole percent. One ceramic formulation, example 5a, contains 94 $BaTiO_2$ and 4.3 $CaZrO_3$ while another ceramic formulation (same composition as in example 4a) contains 91.7 $BaTiO_2$ and 6.3 $CaZrO_3$ in mole percent. The TCC of these two formulations is shown in FIG. 6, from which it can be seen that inclusion of more than about 7 mole percent of the zirconate in the ceramic mixture causes the TCC of the resulting capacitor to go outside the ± 15% limit of the desired standard range. In general, accounting for permutations of acceptor dopant type, mix and quantities as well as variations in firing conditions, at least 1.5 mole percent of a zirconate is required.

The formulations of the above described examples of monolithic ceramic capacitors of this invention are included for comparison with other experimental capacitors in Table I.

Table 1

| Example | BaTiO₃ | ( )ZrO₃ | Mn | Other Acceptors | Mn | Other Acceptors | Total Acceptors |
|---|---|---|---|---|---|---|---|
| | | gram-moles | | | | mole-percent | |
| 1. | .8317 | .0335(Ca) | .0184 | | 2.1 | | 2.1 |
| 2. | .3859 | .0223(Ca) | .0065 | .0039(Mg) | 1.6 | .9 | 2.5 |
| 3. | .4159 | .0167(Ca) | .0065 | .0039(Mg) | 1.5 | .9 | 2.4 |
| 4a. | .4073 | .0279(Ca) | .0092 | | 2.1 | | 2.1 |
| b. | .4073 | .0279(Ca) | .0069 | | 1.6 | | 1.6 |
| c. | .4073 | .0279(Ca) | .0046 | | 1.0 | | 1.0 |
| 5a. | .4159 | .0167(Ca) | .0092 | | 2.1 | | 2.1 |
| 6. | .4287 | | .0065 | | 1.5 | | 1.5 |
| 7. | .4201 | .0112(Ca) | .0065 | | 1.5 | | 1.5 |
| 8. | .4201 | .0112(Sr) | .0065 | | 1.5 | | 1.5 |
| 9. | .4201 | .0112(Ba) | .0065 | | 1.5 | | 1.5 |
| 10. | .4201 | .0112(Ba) | .0035 | | .8 | | .8 |
| 11. | .4201 | .0112(Ba) | .0035 | .0030(Mg) | .8 | .7 | 1.5 |
| 12. | .4201 | .0112(Ba) | .0035 | .0030(Cr) | .8 | .7 | 1.5 |

Table 1-continued

| Example | BaTiO₃ | ( )ZrO₃ | Mn | Other Acceptors | Mn | Other Acceptors | Total Acceptors |
|---|---|---|---|---|---|---|---|
| | | gram-moles | | | | mole-percent | |
| 13. | .4201 | .0112(Ba) | .0035 | .0030(Co) | .8 | .7 | 1.5 |
| 14. | .4201 | .0112(Ba) | .0035 | .0030(Fe) | .8 | .7 | 1.5 |
| 15. | .4201 | .0112(Ba) | .0035 | .0029(Al) | .8 | .7 | 1.5 |
| 16. | .4201 | .0112(Ba) | .0035 | .0029(B) | .8 | .7 | 1.5 |
| 17. | .4201 | .0112(Ba) | .0035 | .0030(Si) | .8 | .7 | 1.5 |
| 18. | .4201 | .0112(Ba) | .0035 | .0065(Mg) | .8 | 1.5 | 2.3 |
| 19. | .4201 | .0112(Ca) | .0035 | .0065(Mg) | .8 | 1.5 | 2.3 |
| 20. | .4201 | .0112(Ca) | .0026 | .0071(Mg) | .6 | 1.6 | 2.2 |
| 21. | .4201 | .0112(Ca) | .0043 | | 1.0 | | 1.0 |
| 22. | .4201 | .0112(Ca) | .0043 | .0033(Cr) | 1.0 | .8 | 1.8 |
| 23. | .4201 | .0112(Ca) | .0043 | .0066(Cr) | 1.0 | 1.5 | 2.5 |
| 24. | .4201 | .0112(Ca) | .0065 | .0035(Mg) | 1.2 | .6 | 1.8 |
| 25. | .4201 | .0112(Ca) | .0043 | .0065(Mg) | 1.0 | 1.5 | 2.5 |

The capacitors of examples 6 through 25 are experimental wafer capacitors that were made in the laboratory as follows: A slip suspension was prepared, as for the above described monolithic capacitors, in an organic binder of a powdered barium titanate ceramic of average particle size less than 5 microns. The ceramic powder included the ingredients as shown in Table I for each of the examples. The slip was cast into a layer approximately 0.5 millimeter thick and when dry was cut into 10 millimeter square wafers, and a paste containing Ni powder was applied to opposite surfaces, leaving a 2mm margin. The wafers were then fired at 1350° C in a partial oxygen atmosphere of $10^{-8}$ atmospheres of oxygen. This partial oxygen atmosphere was achieved by using a mixture of CO and $CO_2$ as is more fully described in the aforementioned patent application S. N. 457,042. It was possible in this way to evaluate the ceramic as a candidate for the ceramic dielectric in a base metal electrode monolithic capacitor. The performance exhibited by these wafer capacitors is shown in Table II.

made 2 minutes after application of the voltage to the capacitor.

Figure 7:
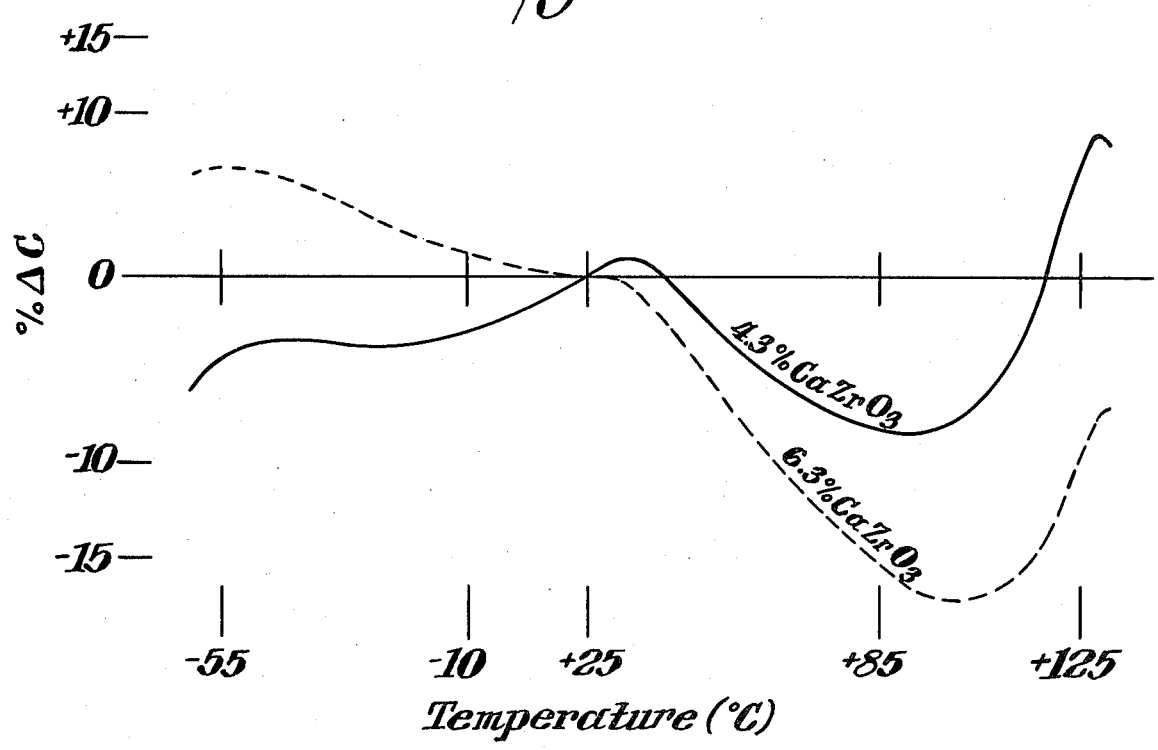
FIG. 7 consists of two curves showing the effect on TCC of varying quantities of zirconates in the ceramic dielectric of capacitors of this invention.

Example 6 wherein no zirconate is included, is provided as a clear illustration in comparison with the following examples, of the TCC modifying role that the zirconate plays in the ceramic material of this invention. Examples 7, 8 and 9 illustrate the different results obtained when the zirconate is of barium, calcium and strontium. It is clear from FIG. 7 and the date of Table II that a slightly larger quantity of $SrZrO_3$ is required to bring the TCC characteristic within the ± 15% standard tolerance limits.

Examples 10 through 17 show the effects of adding other types of dopants when a smaller quantity of manganese has been added than is necessary to bring the TCC within the desired ± 15% range. These other elements are small cation acceptor dopants except silicon. Among these other dopants, magnesium is most effective, chromium is also effective and cobalt would be satisfactory if a little more had been employed. On the other hand aluminum, boron and silicon (examples 15, Table II

| Example | Performance Data — Wafer Capacitors | | | | | | | |
|---|---|---|---|---|---|---|---|---|
| | Cap. (pf.) | D.F. (%) | −55° C | T.C.C. (%) (25° C ref. −10° C | +85° C | +125° C | I.R. at 25° C (ohm-farads) | I.R. at 125° C (ohm-farads) |
| 6. | 1792 | 0.82 | −18 | −9 | +4 | >30 | 560 | 19 |
| 7. | 1964 | 0.66 | −9 | −4 | −12 | +3 | 1964 | 49 |
| 8. | 1995 | 0.58 | −10 | −4 | −5 | +18 | 1167 | 56 |
| 9. | 1722 | 0.50 | −2 | 0 | −8 | +3 | 1148 | 26 |
| 10. | 2433 | 0.40 | −22 | −6 | −7 | −4 | 1622 | 32 |
| 11. | 2035 | 0.43 | −5 | +1 | −13 | −5 | 1272 | 37 |
| 12. | 2117 | 0.59 | −15 | −4 | −12 | +7 | 1628 | 37 |
| 13. | 1791 | 0.46 | −17 | −6 | −6 | +6 | 1628 | 31 |
| 14. | 1918 | 0.6 | −17 | −7 | −4 | +14 | 738 | 58 |
| 15. | 3191 | 0.48 | −26 | −10 | 0 | +7 | 1330 | 39 |
| 16. | 2948 | 0.52 | −30 | −14 | +10 | +9 | 1734 | 37 |
| 17. | 2206 | 0.57 | −28 | −12 | +3 | +8 | 1300 | 32 |
| 18. | 1916 | 0.40 | −6 | +1 | −13 | −5 | 1916 | 53 |
| 19. | 2031 | 0.90 | −10 | −3 | −13 | −2 | 3030 | 107 |
| 20. | 1770 | 1.25 | −16 | −5 | −14 | −5 | 983 | 118 |
| 21. | 1608 | 0.80 | −20 | −8 | −12 | +5 | 1370 | 56 |
| 22. | 1636 | 0.85 | −13.5 | −7 | −9 | +11 | 1450 | 25 |
| 23. | 1932 | 0.90 | −16 | −8 | −11 | +9 | 1756 | 43 |
| 24. | 2150 | 0.64 | −6 | −3 | −11 | +3 | 1791 | 80 |
| 25. | 2176 | 0.80 | −8 | −2 | −13 | −1 | 3956 | 91 |

From the given dimensions of the capacitors of the examples in Table II, it is readily determined that the dielectric constants in each case may be calculated by multiplying the measured capacity value by a factor of about 1.4.

It is also noted that the dimensions ohm-farads are equivalent to seconds. The leakage current measurements from which the data in Table II was derived was 16 and 17) are clearly not acceptable dopants here. Although the iron containing material of example 14 nearly meets the desired ± 15% TCC limits, the insulation resistance at room temperature is marginally low. However, with reference to example 5 and FIG. 7, a slight increase in $CaZrO_3$ content could bring the TCC within limits.

The results of examples 18 and 19 indicate as does the comparison between 7 and 9, the trade off between highest insulation resistance and flattest TCC that must be made in choosing between barium and strontium zirconates. Example 20 demonstrates the need for a minimum quantity of manganese, which quantity should not fall below about 0.5 mole percent even considering that a slightly larger addition of manganese in the material of example 20 would being the TCC within the desired limits. The comparative results of exammple 20 and 19 also suggest that the 1.6 mole percent of magnesium has about reached the limit of tolerance in this ceramic system. This contrasts sharply with the high level of acceptor additive used in base metal ceramic formulations known heretofore.

The examples 21, 22 and 23 show the effect of varying amounts of chromium. Note that example 3 and example 22 employ essentially the same ceramic formulation. Chromium additives are clearly effective in improving the insulation resistance but not as effective as magnesium for smoothing the TCC.

The excellent results that can be achieved in yet other capacitors made according to this invention are illustrated in examples 24 and 25.

The monolithic capacitors, for which performance data is given in Table III were made by the same process as was employed for making the capacitors of example 1. The dielectric ceramic of capacitors in examples 26 and 27 have the same constituents as in the wafer capacitors of example 24 while in examples 28 and 29 the constituents are the same as for the wafer capacitors of example 25. The two pairs of examples in Table III illustrate the effects on capacitor performance of changes in the partial oxygen atmosphere. The most significant effect is seen to be a decrease in insulation resistance at 125° C as the atmosphere becomes more reducing while the TCC is slightly altered, the TCC becoming more positive at both −55° C and +125° C as the partial oxygen pressure decreases. For these reasons it is essential that the firing atmosphere be at least as oxygen rich as $10^{-9}$ atmospheres of oxygen for making the capacitors of this invention.

but more generally other acceptor compounds that are transformed to the oxide at firing are suitable. However, such other compounds as the sulphates and nitrates may produce gases that adversely affect the firing atmosphere or the control thereof.

What is claimed is:

1. A temperature stable monolithic ceramic capacitor comprising a dense fine grained ceramic body at least one base metal electrode buried therein, and at least one other electrode in spaced relationship with said at least one base metal electrode said body having a granular crystal phase of barium titanate and a zirconate and an interstitial phase including a manganese titanate between the grains, said body containing no less than 90 mole percent of said titanate, from 1.5 to 7 mole percent of said zirconate, from 0.5 to 2.3 mole percent manganese and from 0 to 1.7 mole percent of other acceptor dopants selected from magnesium, chromium cobalt and iron, the ratio of the large to small cations in said body being from 0.975 to 1.0 and the ratio of the large to small cations in said granular phase being greater than 1.0, said capacitor having an insulation resistance capacity product of greater than 500 ohm-farads at 25° C and greater than 15 ohm-farads at 125° C and exhibiting a capacity versus temperature characteristic that remains within ± 15% of the value at room temperature over the range of −55° C to 125° C.

2. The capacitor of claims 1 wherein the total of said manganese plus said other acceptor dopants in said body is no greater than 2.5 mole percent.

3. The capacitor of claim 1 wherein said grains are no larger than 5 microns in diameter.

4. The capacitor of claim 1 wherein said base metal is selected from nickel, iron, cobalt and alloys thereof.

5. The capacitor of claim 1 wherein said titanate and said zirconate are heterogeneous within said grains, said zirconate having a highest concentration near the outer surfaces of said grains.

6. The capacitor of claim 1 wherein said zirconate is selected from $BaZrO_3$, $CaZrO_3$ and $SrZrO_3$.

7. The capacitor of claim 1 wherein said ceramic

Table III

| | | | | | Performance vs. Firing Atmosphere | | | | |
|---|---|---|---|---|---|---|---|---|---|
| | | | | | Monolithic Capacitors | | | | |
| | | | | | T.C.C.(%) | | | I.R. at | I.R. at |
| | Oxygen | Cap. | K | D.F. | (25° C ref.) | | | 25° C | 125° C |
| Example | Atm. | (pf) | (25° C) | (%) | −55° C | −10° C | +85° C | +125° C | (ohm-farads) | (ohm-farads) |
| 26. | $10^{-8}$ | 3041 | 2800 | 0.85 | −7 | −3 | −10 | +3 | 2172 | 78 |
| 27. | $10^{-7}$ | 2545 | 2850 | 0.75 | −10 | −3 | −14 | −4 | 1818 | 159 |
| 28. | $10^{-8}$ | 3699 | 3000 | 1.0 | −10 | −3 | −12 | −1 | 3083 | 88 |
| 29. | $10^{-7}$ | 2958 | 3100 | 0.91 | −14 | −4 | −14 | −3 | 2275 | 325 |

In the practice of this invention it is to be noted that the acceptors may be introduced into the ceramic mixture as oxides and carbonates as has been illustrated, body consists essentially of 95.2 $BaTiO_3$, 2.5 $CaZrO_3$, 0.8 Mn and 1.5 Mg in mole percent.

* * * * *